Dec. 3, 1968                      P. BAUM                      3,414,642
METHOD OF MANUFACTURING ORNAMENTAL PLASTIC PRODUCTS
Filed March 11, 1966                                3 Sheets-Sheet 1
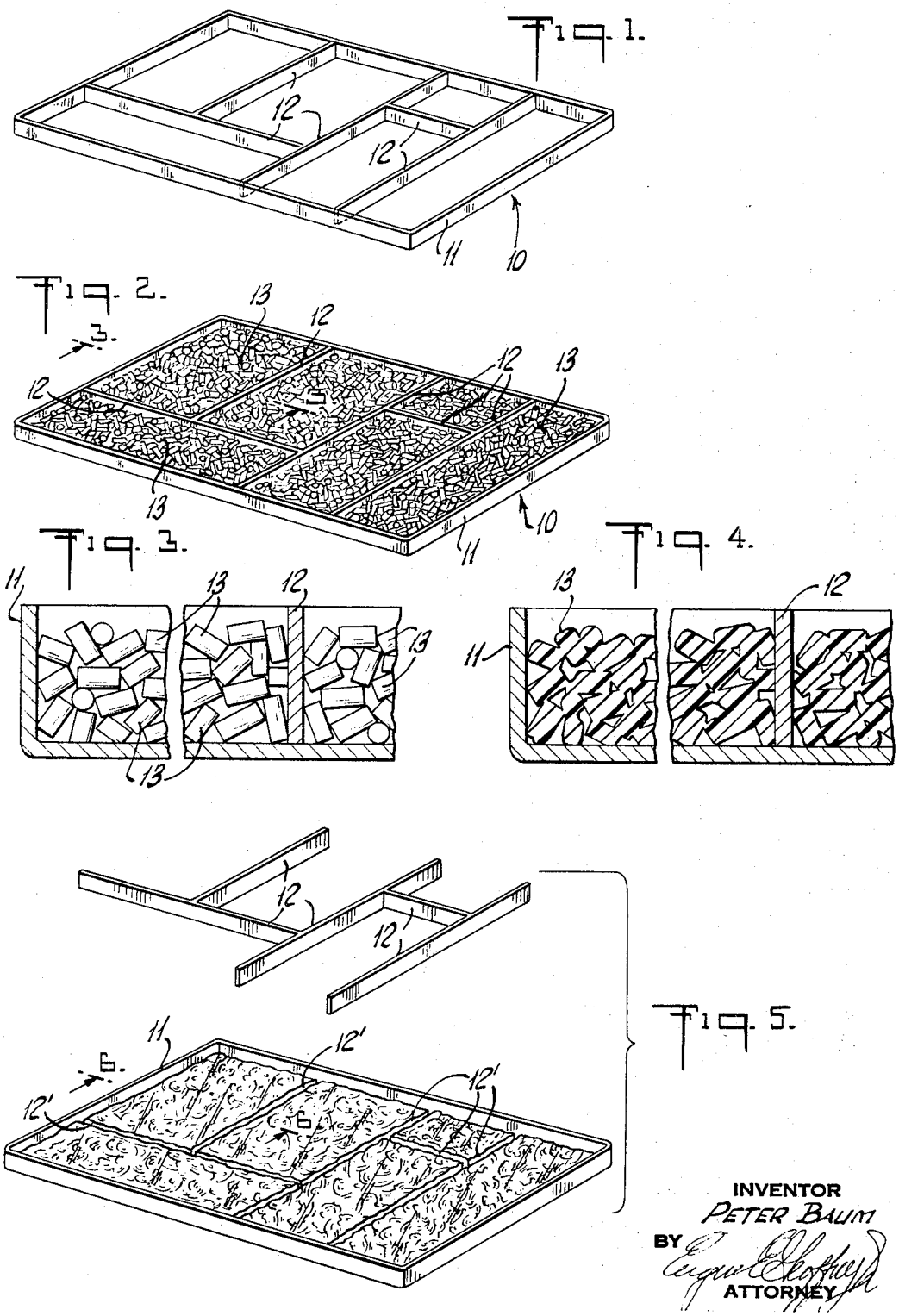
INVENTOR
PETER BAUM
BY
ATTORNEY Dec. 3, 1968 P. BAUM 3,414,642

METHOD OF MANUFACTURING ORNAMENTAL PLASTIC PRODUCTS

Filed March 11, 1966 3 Sheets-Sheet 2

INVENTOR
PETER BAUM
BY
ATTORNEY

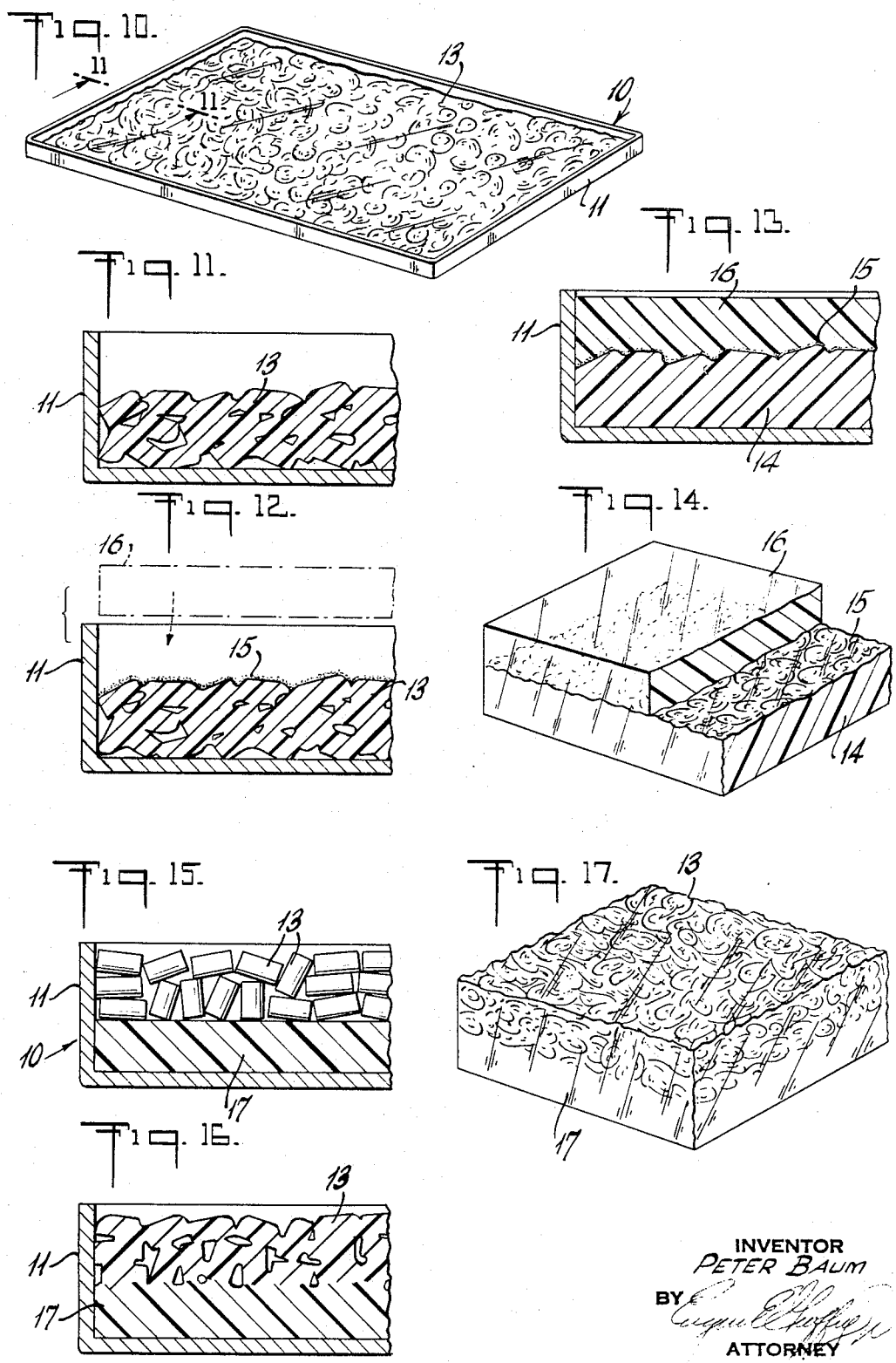

United States Patent Office 3,414,642
Patented Dec. 3, 1968

3,414,642
METHOD OF MANUFACTURING ORNAMENTAL PLASTIC PRODUCTS
Peter Baum, La Grangeville, N.Y., assignor to Robinson, Lewis, and Rubin, New York, N.Y., a corporation of New York
Filed Mar. 11, 1966, Ser. No. 533,519
7 Claims. (Cl. 264—73)

ABSTRACT OF THE DISCLOSURE

The method of making an ornamental plastic product wherein pellets of plastic material are placed in a tray having removable partitions, heating the pellets to congeal them in each area and then removing the partitions and reheating the pellets to produce a unitary sheet.

---

This invention relates to plastic products and more specifically to novel and improved ornamental plastic products and methods for manufacturing such products.

One object of the invention resides in the provision of a novel and improved method for manufacturing ornamental plastic sheets simulating stained glass panels and the like and characterized by its simplicity and relatively low cost.

Another object of the invention resides in the provision of a novel and improved method for manufacturing ornamental sheets of plastic utilizing plastic materials in pellet and other forms and in varied colors in order to achieve varied decorative effects.

Another object of the invention resides in a novel and improved method for manufacturing ornamental plastic products combined with metallic materials to produce unusual decorative effects.

A still further object of the invention resides in the provision of a novel and improved method for manufacturing ornamental sheet materials of plastics that facilities the production of a variety of surface textures.

A still further object of the invention resides in the provision of novel and improved ornamental products containing plastic materials alone and in combination with other materials to produce varied ornamental effects.

The above and other objects of the invention will become more apparent from the following description and accompanying drawings forming part of this application.

In the drawings:

FIGURE 1 is a perspective view of a tray containing partitioning means in the form of strips of metal or other suitable material.

FIGURE 2 is a perspective view similar to FIGURE 1 but with plastic pellets of varied colors at least partially filling each of the several compartments.

FIGURE 3 is a cross sectional view of FIGURE 2 taken along the line 3—3 thereof.

FIGURE 4 is a view similar to FIGURE 3 showing the pellets adhered one to the others after initial treatment pursuant to one step of the method in accordance with the invention.

FIGURE 5 is a perspective view of the structure shown in FIGURE 4 with the partitions removed pursuant to another step of the method in accordance with the invention.

FIGURE 10 is a perspective view of the initial step in manufacturing a modified product in accordance with the invention.

FIGURE 11 is a cross sectional view of FIGURE 10 taken along the line 11—11 thereof.

FIGURE 12 is a cross sectional view similar to FIGURE 11 and illustrating a further step in the manufacture of said modified product in accordance with the invention.

FIGURE 13 is a cross sectional view similar to FIGURES 11 and 12 showing said modified product after final treatment in accordance with the invention.

FIGURE 14 is a fragmentary view in partial section of the modified product in accordance with the invention.

FIGURE 15 is a fragmentary cross sectional view of a structure showing one step in the process of manufacturing still another modified product in accordance with the invention.

FIGURE 16 is a cross sectional view similar to FIGURE 15 showing the completed product.

FIGURE 17 is a perspective view of the product produced by the method ilustrated in FIGURES 15 and 16.

The novel and improved decorative and ornamental products and the improved methods of manufacture in accordance with the invention enable the attainment of a wide variety of designs and effects in that the products may be made to simulate stained glass windows, depict scenes or produce any other of a wide variety of designs. In addition the surface texture may be readily controlled to achieve still further decorative effects as for instance the surface of the completed product may be substantially smooth or it may be provided with a non-uniform or pebbled surface.

Figure 6:
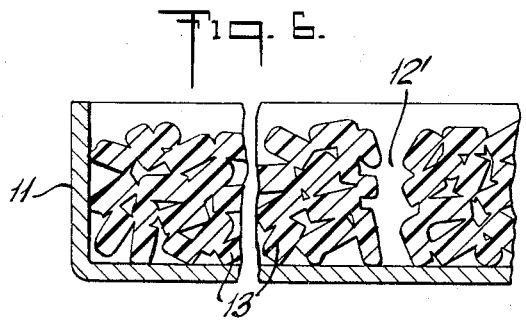
FIGURE 6 is a cross sectional view of FIGURE 5 taken along the line 6—6 thereof.
Figure 7:
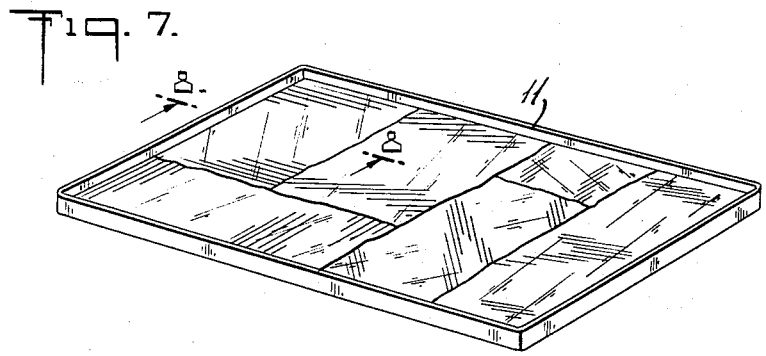
FIGURE 7 is a perspective view of the plastic structure shown in FIGURE 5 after further treatment in accordance with the invention.
Figure 8:
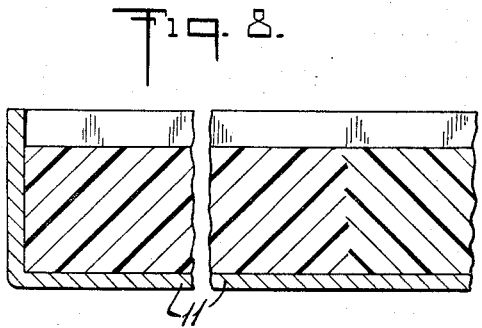
FIGURE 8 is a cross sectional view of FIGURE 7 taken along the line 8—8 thereof.
Figure 9:
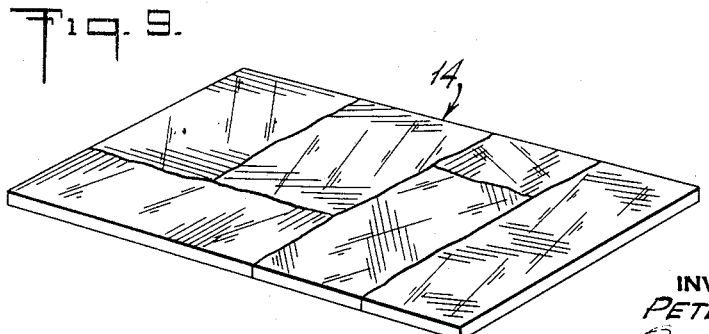
FIGURE 9 is a perspective view of a completed product in accordance with the invention.

Referring now to the drawings and more specifically to FIGURES 1 through 9, a tray or pan generally denoted by the numeral 10 is formed of any suitable material such as steel, Teflon, or the like and is provided with a peripheral edge 11. The tray 10 is fitted with partitions 12 in accordance with any desired design. Each compartment formed by the partitions 12 is filled with a plastic material 13 in pellet or other suitable form. Normally the pellets in adjoining compartments would be of different colors and each compartment is filled to a level that will produce a sheet of desired thickness. While rectangular compartments have been illustrated in FIGURES 1 and 2, it is of course apparent that any ornamental arrangement of the partitions can be utilized, as for instance the pan 10 could be arranged with a plurality of circular elements or they may be arranged to depict a figure, scene, or the like.

After the several compartments have been filled with pellets of desired colors, it is desirable to approximately level the pellets in each compartment so that the depth of the pellets is substantially uniform throughout the entire area.

With the pan and pellets prepared in the manner described above, the pan 10 is placed in an oven arranged to substantially uniformly heat the pan and the pellets to effect a slight melting of the plastic material in order to cause the pellets to adhere one to the others so that the pellets in each compartment, while forming a substantially unitary mass, generally maintain at least in part their original configurations. Through proper control of the oven temperature and the heating time this can be accomplished with little if any adherence of the pellets to either the peripheral wall 11 of the pan or to the partitions 12. It is understood, of course, that the temperature and time required for this initial step of the operation is a function of the particular plastic material utilized. The duration of the initial heating step is also a function of the depth of the pellets in each of the compartments since the thicker the layer, the more time is required in order to obtain the proper coagulation or adherence of the pellets one to the other. In the case of acetates it has been found that an oven temperature of the order of 300 degrees Fahrenheit to 350 degrees Fahrenheit is satisfactory for this initial step and the heating period may vary from 15 to 25 minutes depending on the thickness of the pellet layer. If the resultant sheet is to be of the order of 3/16 of an inch, this initial coagulation can be attained by heating the pan at 350 degrees Fahrenheit for approximately 15 minutes while a 3/8" sheet may require from 20 to 25 minutes. Other types of plastics may also be utilized such as acrylics and polystyrenes and the like.

Upon completion of the initial heating step, the pan 10 is removed from the oven and preferably permitted to cool and thereby facilitate handling and removal of the partitions 12. Since the initial heating step is controlled to effect coagulation or adherence of the pellets one to the other, it has been found that through termination of the heating as soon as the coagulation has been effected little if any adherence of the pellets to the partitions or peripheral pan wall 11 will result. This facilitates removal of the partitions 12 as illustrated in FIGURE 5, which leaves a plurality of gaps 12' between the coagulated pellets in each of the compartments. It is desirable in the formation of the partitions 12 to make them of relatively thin material in order to minimize the width of the gap 12 when the partitions are removed while still providing adequate stiffness and rigidity. In actual practice partitions having a thickness of the order of 1/16 to 1/8 of an inch have been found satisfactory, though it is of course advantageous to form the partitions of as thin a material as possible consistent with the necessary strength.

After removal of the partitions 12 the pan 10 is then returned to the oven and the pellets are again heated until melting occurs to form a substantially unitary mass. During this heating period the plastic material in each compartment will flow to close the gaps 12' and thus form a unitary structure as illustrated for instance in FIGURES 7 and 8. By controlling both the heating time and the temperature, it is possible to achieve either a smooth surface throughout the entire area or a slightly textured or pebbled surface depending on the resultant effect desired. The pan 10 is then removed from the oven and permitted to cool, whereupon the completed plastic sheet generally denoted by the numeral 14 can be dislodged from the pan. In actual practice it has been found that when utilizing a pan of steel that the slight adherence of the plastic material to the edge of the pan does not interfere with removal of the sheet from the pan. With materials such as Teflon little if any adherence would be encountered. The resultant product illustrated in FIGURE 9 can then be further treated or formed in any desired manner.

Referring now to FIGURES 10 through 14 illustrating a modified embodiment of the invention, the tray 10 is provided with a plastic material preferably in the form of pellets 13 arranged in a substantially uniform layer throughout the area of the tray. The pellets may then be preheated to effect a coagulation of the pellets into a substantially unitary mass as illustrated in FIGURE 11. Metal powder 15 is then sprayed or otherwise applied to the top surface of the coagulated pellets 13 as shown in FIGURE 12. In the instant embodiment of the invention the coated pellets 13 are then provided with an overlying sheet of plastic 16. The composite structure is then heated sufficiently to further coagulate the pellets 13 while retaining a pebbled or non-uniform surface which is embedded in the underside of the plastic sheet 16 as illustrated in FIGURES 13 and 14, the latter illustrating the completed product with portions thereof in cross section to illustrate the structure. The total thickness of the completed structure shown in FIGURE 13 may vary over a relatively wide range. When forming sheets of the order of three feet by five feet, thicknesses in the range of 3/16 of an inch to 1/4 of an inch have been found to be satisfactory.

A further modification is illustrated in FIGURES 15 through 17. In this form of the invention the tray 10 is first provided with a continuous sheet of plastic 17 and a substantially uniform layer of pellets 13 is then placed on top of the layer 17. The sheet 17 and pellets 13 are then heated to coagulate the pellets 13 and cause adherence to the sheet 17 as illustrated in FIGURE 16. This procedure produces a resultant article having a non-uniform surface as illustrated in FIGURE 17. The non-uniformity of the surface is of course governed by the temperature to which the plastic materials are heated and the time during which they are subjected to that temperature. The specific temperatures and time durations are of course functions of the melting points of the particular plastic materials involved. In normal cases the heating temperature should preferably be slightly above the melting point of the plastic materials, and the quality of the surface obtained by varying the time duration to which the plastic materials are subjected to the melting temperature. Should the temperature be raised substantially beyond the melting point of the plastic materials the time during which the materials are subjected to these high temperatures must be materially reduced, and it has been found that by varying the temperatures and time duration, varied ornamental effects can be obtained.

While the forms of the invention as illustrated in FIGURES 10 through 17 have a uniform ornamental appearance throughout their entire extent, it is possible to provide a variety of ornamental effects through the utilization of partitions such as the partitions 12 shown in FIGURE 1. When using the partitions, it is desirable to use two individual heating steps as in the case of the embodiment shown in FIGURE 1. The initial preheating step would merely provide an initial coagulation of the pellets to permit removal of the partitions and then the resultant plastic structure would be reheated to form a substantially uniform sheet having the desired ornamental characteristics.

While only certain embodiments of the invention have been illustrated and described, it is apparent that alterations, modifications and changes may be made without departing from the true scope and spirit thereof as defined by the appended claims.

What is claimed is:

1. The method of manufacturing a plastic product comprising the steps of placing differently colored plastic material in pellet form within a tray in a predetermined arrangement, and then heating said material to a temperature causing them to adhere one to the other and form a unitary sheet, said tray including removable partitions dividing the tray area into discrete areas to maintain a separation between the plastic pellets in each area and wherein said method further includes the steps of heating said pellets to congeal the pellets in each area, removing said partitions and then reheating the congealed pellets to cause sufficient melting of the plastic pellets to fill the gaps left by removal of said partitions and produce a unitary sheet.

2. The method according to claim 1 wherein said reheating step includes heating of said plastic pellets above the melting points thereof and maintaining such temperature until all of said pellets are completely melted.

3. The method according to claim 1 wherein at least certain areas of pellets are coated with a metallic powder.

4. The method according to claim 1 wherein a continuous sheet of plastic is placed in underlying relationship to said plastic materials, and said sheet and materials are heated to form a unitary mass.

5. The method according to claim 1 wherein at least certain areas of pellets are coated with a powdered metallic material, said pellets are covered by an overlying sheet of material and said pellets and sheet are heated to form a unitary mass with said pellets being only partially melted to provide a pebble-like finish embedded in the underside of said sheet.

6. The method according to claim 1 wherein a continuous sheet of plastic is placed in underlying relationship to said pellets and said pellets and sheet are heated to cause said pellets to at least adhere one to the others and to said sheet.

7. The method according to claim 1 wherein said method further includes the steps of coating said congealed pellets with a metal powder and then placing a plastic sheet in overlying relationship with said congealed pellets prior to said heating step.

References Cited

UNITED STATES PATENTS

| | | | |
|---|---|---|---|
| 2,605,204 | 7/1952 | Benedict et al. | 161—151 |
| 2,761,177 | 9/1956 | Waiters | 264—126 |
| 3,208,900 | 9/1965 | Inklaar | 264—126 |
| 3,219,735 | 11/1965 | Iverson et al. | 117—72 |

FOREIGN PATENTS 440,879    1/1936    Great Britain.

JULIUS FROME, *Primary Examiner.*

T. MORRIS, *Assistant Examiner.*